C. A. BEHLEN.
VEHICLE GEAR.
APPLICATION FILED FEB. 5, 1912.

1,051,667.

Patented Jan. 28, 1913.

2 SHEETS—SHEET 1.

WITNESSES
C. K. Davis
A. F. Coffrey

INVENTOR
Charles A. Behlen,
By F. E. Stebbins, Attorney.

C. A. BEHLEN.
VEHICLE GEAR.
APPLICATION FILED FEB. 5, 1912.
1,051,667.
Patented Jan. 28, 1913.
2 SHEETS—SHEET 2.
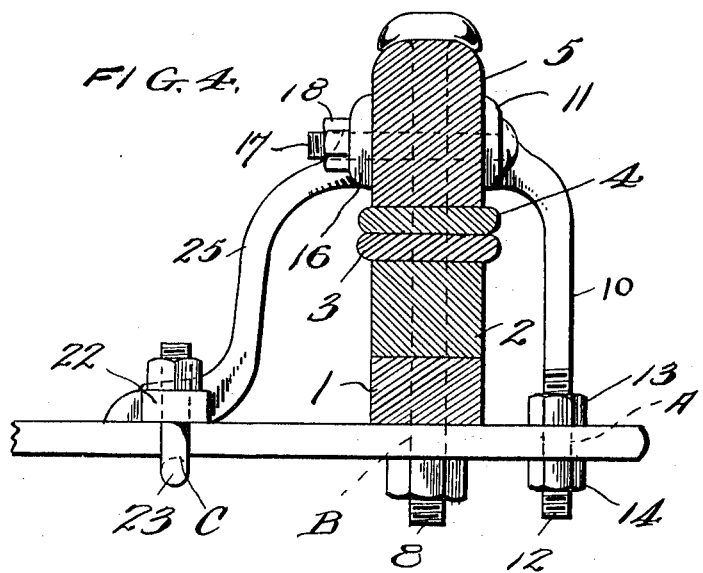
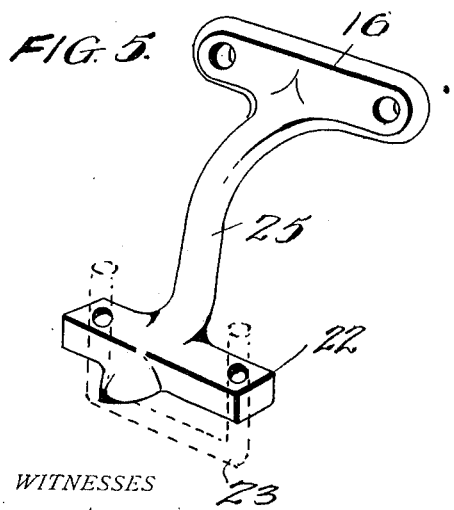
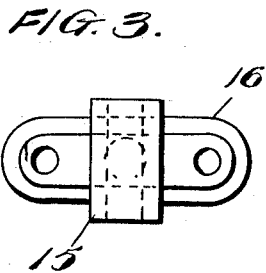
WITNESSES
C. K. Davis
A. F. Caffrey
INVENTOR
Charles A. Behlen.
By F. E. Stebbins, Attorney.

UNITED STATES PATENT OFFICE.

CHARLES A. BEHLEN, OF FRANKLIN, VIRGINIA.

VEHICLE-GEAR.

1,051,667.   Specification of Letters Patent.   Patented Jan. 28, 1913.

Application filed February 5, 1912. Serial No. 675,601.

*To all whom it may concern:*

Be it known that I, CHARLES A. BEHLEN, a citizen of the United States, residing at Franklin, in the county of Southampton and State of Virginia, have invented certain new and useful Improvements in Vehicle-Gears, of which the following is a specification.

My invention relates to vehicle gears, and especially to such as are known as side spring gears wherein two side springs and a center spring are combined, respectively, with the head block and the axle. As commonly constructed, the center spring has a hole at the end and a front brace with its lower end secured in the hole and its top end bolted to the head block. A second hole is also made in the spring for the passage of the king bolt. In use the gear is subjected to side and twisting strains which break the center spring on the line of the hole therein, and sometimes the front brace or king bolt or both are broken initially or following the breaking of the spring, inasmuch as when the spring breaks cross strains are imparted to the king bolt and the brace.

The object of my invention is to obviate the imperfections of prior constructions by locating the fulcrum point of the center spring back of the axle and anchoring the spring to the head block without making a hole in the spring, thus retaining the entire thickness of the metal at the fulcrum point. The center spring, as well as the side springs, is thus connected with the head block.

The invention consists in certain novelties of construction and combinations of parts as hereinafter set forth and claimed.

The accompanying drawings illustrate two examples of the physical embodiment of the invention constructed according to the best modes of procedure I have so far devised for the purpose.

Figure 1:
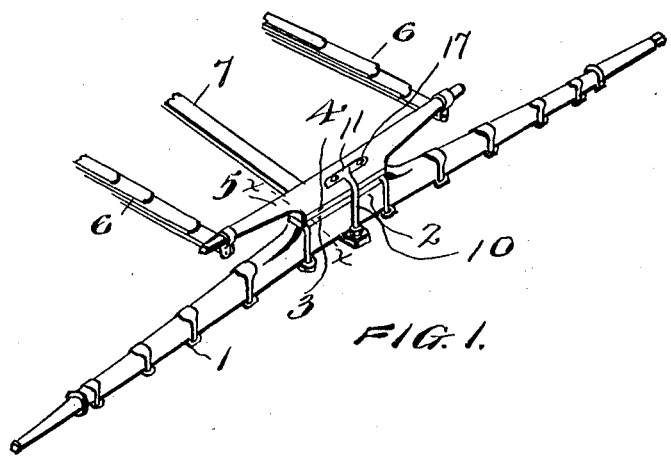
Figure 2:
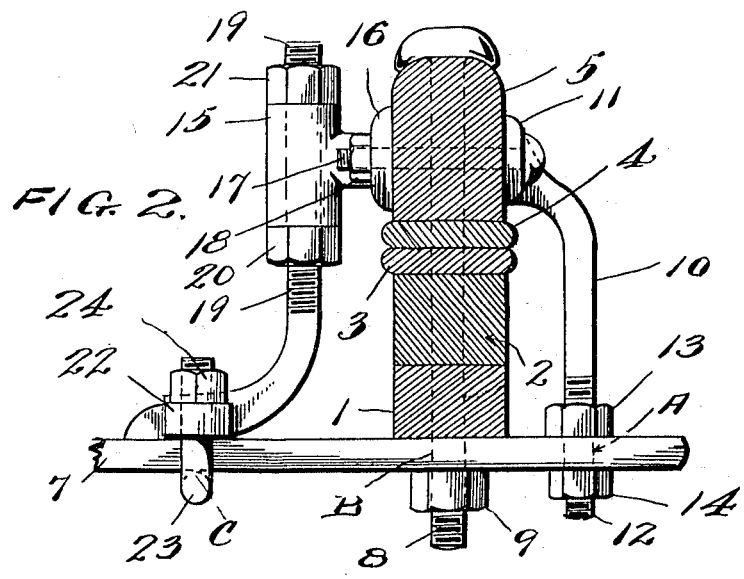

Figure 1 is a perspective view of the front part of a vehicle side spring gear showing parts of the side springs and center spring. Fig. 2 is an enlarged sectional view taken on line *x—x* of Fig. 1, showing an adjustable rear brace connecting the spring with the head block, and the fulcrum point of the spring. Fig. 3 is a plan view of the barrel and plate which are secured to the head block. Fig. 4 is a sectional view, similar to Fig. 2, showing an integral rear brace. Fig. 5 is a perspective view of the rear brace of Fig. 4 detached.

Referring to the figures, the numeral 1 designates an axle with a king bolt hole therethrough; 2, a perforated axle bed secured to the axle by clips; 3, the perforated lower fifth wheel plate secured to the axle bed by clips at the ends; 4, the perforated upper fifth wheel plate secured to the head block; 5, the perforated head block; 6, 6, the side leaf springs secured by clips to the ends of the head block; 7, the center leaf spring having two holes A and B at its end; 8, a king bolt passed through the perforations in the head block, fifth wheel plates, axle bed and axle, and through the hole B in the center spring; 9, a nut on the bolt; 10, a front brace having a perforated plate 11, a threaded prong 12 passed through the hole A in the center spring and provided with two nuts 13, 14, one above and one below the spring; 15, in Figs. 2 and 3, a perforated barrel, made integral with a perforated plate 16, which perforations in the plate correspond with the perforations in the plate 11 of the front brace; 17, two bolts passed through the perforations in the plate 11, holes in the head block, and the perforations in the plate 16, with nuts 18 thereupon which rigidly secure said plates to the head block; 19, a threaded shank located within the barrel 15 and adjustable relative thereto by the nuts 20, 21, as shown; 22, a perforated plate integral with the shank 19 and of greater length than the width of the center spring; 23, a U bolt with threaded ends passed around the center spring and the ends within the perforations in the plate 22 and projecting above the plate; and 24 are nuts on the ends of the U-shaped bolt.

In Figs. 4 and 5 the rear brace is made in a single piece, the shank 25 connecting the plates 22 and 16, which latter are like those shown as parts of the adjustable brace.

The relative locations of the several parts and elements are clear from an inspection of the drawings, and their combination forms a union of parts which effectively withstands the strains of service and prevents the breaking of the center spring, front brace, or king bolt. The fulcrum point of the center spring is at C, located back of the axle, and the strains to which the spring is subjected are transmitted in part to the head block. The head block, moreover, is normally held in line with the axle bed and axle, and should a displacement occur the manipulation of the nuts on the front brace and the rear adjustable brace will bring it into line. The rear brace in both the examples constitutes a safety device, for should the king bolt or front brace break the rear brace will hold the parts together till repairs can be made.

What I claim is:

1. The combination in a vehicle gear, of an axle, a head block, side springs with their ends secured to the head block, a center spring with its end located beneath the axle, a bolt connecting the axle with the center spring, and a rear brace the top end of which is secured to the head block and the opposite end extending down to a position directly back of the axle and attached to the center spring by a clip surrounding the said spring.

2. The combination in a vehicle gear, of an axle, a head block, side springs with their ends secured to the head block, a center spring, a bolt connecting the axle with the center spring, and a rear bodily adjustable brace one end of which is secured to the head block and the opposite end attached to the center spring.

3. The combination in a vehicle gear, of an axle, a head block, side springs with their ends secured to the head block, a center spring, a bolt connecting the axle with the center spring, a front brace secured at one end to the center spring and at the other end rigidly and directly secured to the head block, and a rear brace one end of which is secured to the head block and the opposite end attached to the center spring by a clip surrounding the said spring.

4. The combination in a vehicle gear, of an axle, a head block, side springs with their ends secured to the head block, a center spring, a bolt connecting the axle with the center spring, a front brace secured to the center spring and to the head block, and a rear bodily adjustable brace one end of which is secured to the head block and the opposite end attached to the center spring.

5. The combination with an axle, head block, king bolt, and center spring, of a front brace secured to the end of the spring and to the head block, and a rear brace secured at one end to the head block and at the opposite end to the spring by a plate, U-shaped bolt and nuts located directly at the rear of the axle.

6. An adjustable brace for vehicles comprised of a perforated plate and perforated barrel, a threaded shank with a perforated plate and threaded U bolt, and nuts at the end, the shank being located within the perforation of the barrel, and nuts upon the threaded shank for adjusting the shank relative to the barrel.

In testimony whereof I affix my signature in presence of two witnesses.

CHARLES A. BEHLEN.

Witnesses:
C. C. VAUGHAN, Jr.,
H. C. THORNTON.

---

Copies of this patent may be obtained for five cents each, by addressing the "Commissioner of Patents, Washington, D. C."